(12) United States Patent
Libourel et al.

(10) Patent No.: US 9,254,063 B2
(45) Date of Patent: Feb. 9, 2016

(54) DOUBLE WALLED INSULATED CONTAINER WITH RECHARGEABLE VACUUM

(75) Inventors: Charles Libourel, Cincinnati, OH (US); James K. Simonelli, Anderson, SC (US)

(73) Assignee: Tervis Tumbler Company, North Venice, FL (US)

( * ) Notice: Subject to any disclaimer, the term of this patent is extended or adjusted under 35 U.S.C. 154(b) by 369 days.

(21) Appl. No.: 13/401,031

(22) Filed: Feb. 21, 2012

(65) Prior Publication Data
US 2013/0213978 A1    Aug. 22, 2013

(51) Int. Cl.
*B65D 81/00* (2006.01)
*A47J 41/02* (2006.01)
*A47J 41/00* (2006.01)
*B65D 81/38* (2006.01)

(52) U.S. Cl.
CPC ............. *A47J 41/02* (2013.01); *A47J 41/0077* (2013.01); *B65D 81/3837* (2013.01)

(58) Field of Classification Search
CPC .. B65D 81/38; B65D 81/383; B65D 81/3841; B65D 81/3869; B65D 81/3881; B65D 81/3865; A47J 41/00; A47J 41/02; A47J 41/022
USPC .......... 220/592.16, 592.17, 592.27; 215/12.1, 215/13.1
See application file for complete search history.

(56) References Cited

U.S. PATENT DOCUMENTS

| | | | | | |
|---|---|---|---|---|---|
| 723,796 | A | * | 3/1903 | Williams | 220/592.17 |
| 2,981,430 | A | * | 4/1961 | Chin et al. | 215/12.1 |
| 3,863,794 | A | * | 2/1975 | Hata | 215/12.2 |
| 4,782,670 | A | * | 11/1988 | Long et al. | 62/457.4 |
| 6,601,720 | B2 | * | 8/2003 | Meyers et al. | 215/11.5 |
| 6,789,393 | B2 | * | 9/2004 | Dais et al. | 62/457.6 |
| 2006/0000733 | A1 | * | 1/2006 | Albritton et al. | 206/432 |
| 2007/0114485 | A1 | * | 5/2007 | Adams et al. | 251/366 |
| 2010/0200599 | A1 | * | 8/2010 | Molthen et al. | 220/592.27 |

* cited by examiner

*Primary Examiner* — Anthony Stashick
*Assistant Examiner* — Ernesto Grano
(74) *Attorney, Agent, or Firm* — Caesar Rivise, PC

(57) ABSTRACT

An insulated container is disclosed. The container has an outer plastic member, an inner plastic member and an insulating, e.g., vacuum space, located therebetween. A vent assembly is located in the outer member in communication with the vacuum space. The vent assembly may be arranged to prevent liquid from entering into the insulating space and may be arranged to equalize the internal pressure within the insulating space and the ambient atmospheric pressures surrounding the outer member, while allowing higher internal pressure within the insulating space to vent to the ambient atmosphere when the container is heated, and to close off to seal the insulating space to maintain the vacuum therein when the container is cooled.

12 Claims, 5 Drawing Sheets

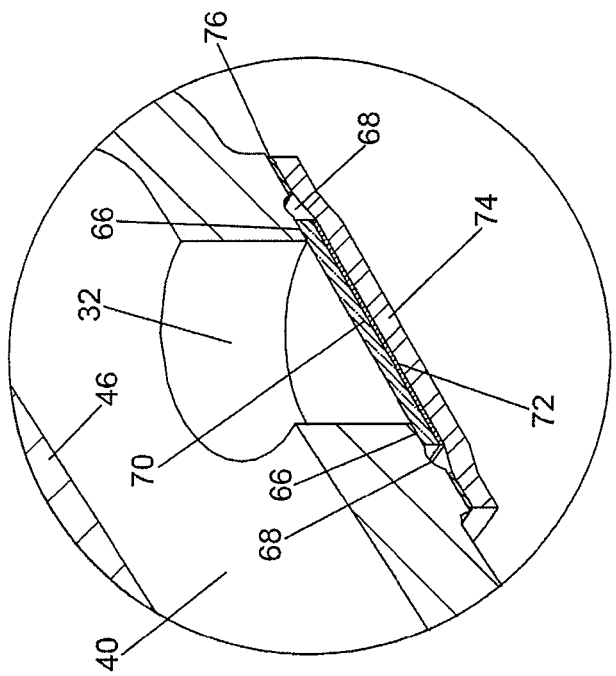
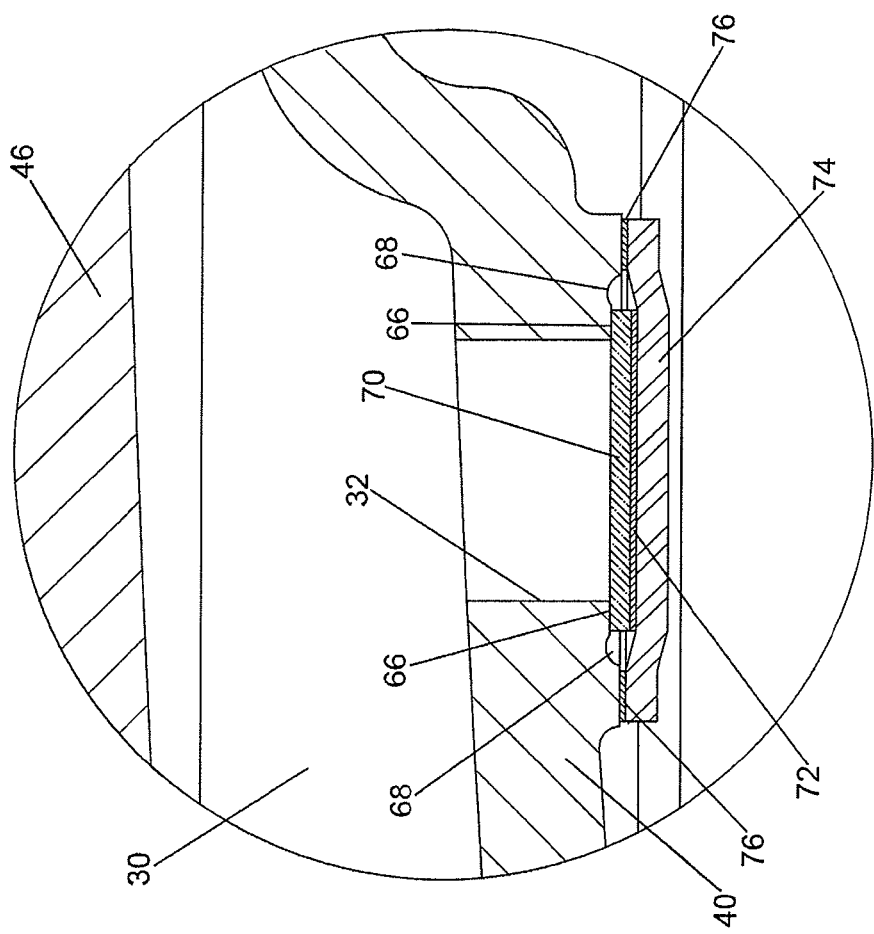

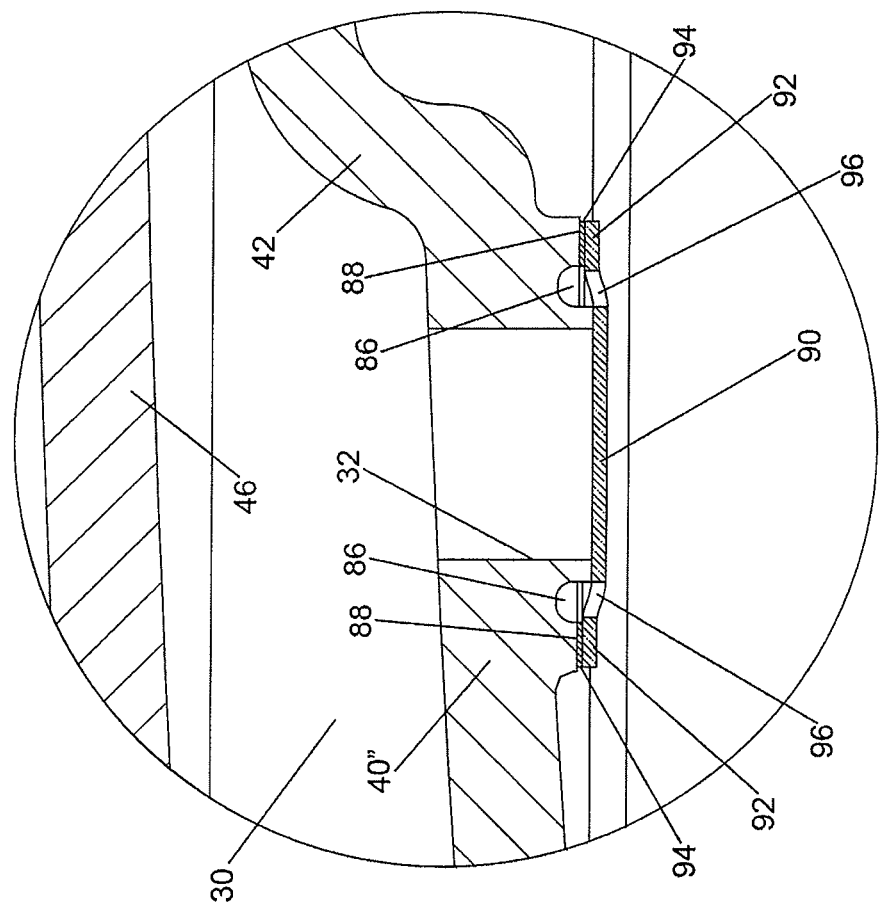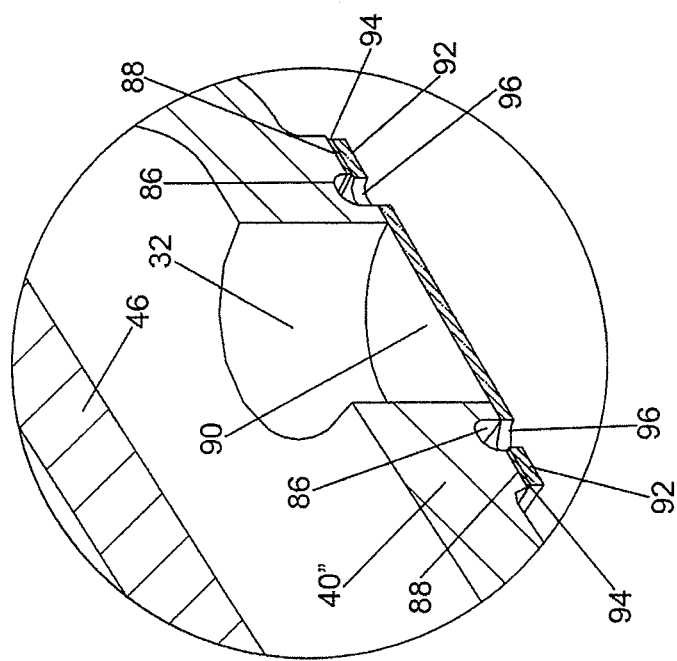

DOUBLE WALLED INSULATED CONTAINER WITH RECHARGEABLE VACUUM

CROSS-REFERENCE TO RELATED APPLICATIONS

"Not Applicable"

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates generally to insulated containers and more particularly to double walled insulated containers.

BACKGROUND OF THE INVENTION

Insulated containers or vessels commonly include an outer member or vessel in which an inner member or vessel is located, with the space between those vessels forming an insulating region surrounding the inner vessel. As is known heat can be transferred between the inner and outer vessel by three methods. They are conduction, radiation and convection. Air and most gases which can be disposed within the insulating space are good insulators against conduction. However, they easily convect. Thus, in an attempt to provide effective insulation, containers frequently make use of a narrow insulating space to decrease the amount of convection. Another manner for providing effective insulation is to reduce the amount of gas in the insulating space, i.e., create some vacuum therein. This action further decreases convection. In addition, with less media present it also reduces conduction heat transfer. To reduce the radiation transfer the inner walls of the insulating space can be covered with a highly reflective surface to reflect back the radiated energy. One such double wall, low pressure insulated container having with a highly reflective surface is the traditional vacuum bottle. However, traditional vacuum bottles are expensive due to having to be truly hermetically sealed. If they leak, even slowly, they lose a large part of their insulation ability. They are also typically constructed from glass or metals, because plastics are gas permeable.

Double wall insulated containers, like those described above, also exhibit a problem when subjected to the high temperatures encountered when they are washed in a dishwasher. In particular, the high heat increases the pressure of the gas volume trapped in the insulation space between the container's double walls. This is especially a problem in the case of low cost plastic containers. The increased pressure can either burst the containment or distort the container. While placing a hole in the container to vent the pressure in the insulating space to prevent such potentially damaging action is a potential solution, it necessarily allows the insulating space to fill with water or other contaminants. This decreases the vessel's insulating ability and may be a sanitary hazard.

Accordingly, a need exists for a double walled insulated container, which is formed of low cost plastic materials, to be able to withstand the rigors of repeated washings in a dishwasher, while maintaining its insulating properties and without presenting a sanitation hazard. The subject invention addresses that need.

SUMMARY OF THE INVENTION

The subject invention is directed to a container comprising an outer member, an inner member, an insulating space and a vent assembly. The outer member is formed of a plastic material and has a sidewall. The inner member is formed of a plastic material and has a sidewall. The inner member is disposed within the outer member, with the insulating space being located between the sidewalls of those members. The vent assembly is located in the outer member in communication with the insulating space.

In accordance with one preferred aspect of the invention the vent assembly is arranged, e.g., includes a gas permeable membrane, to prevent liquid from entering into the insulating space.

In accordance with another preferred aspect of the invention the insulating space includes some vacuum therein and the vent assembly is arranged, e.g., includes a one-way check valve, to equalize the internal pressure within the insulating space and the ambient atmospheric pressure surrounding the outer member to allow higher internal pressure within the insulating space to vent to the ambient atmosphere when the container is heated and to close off to seal the insulating space to maintain the vacuum therein when the container is cooled.

In accordance with still another, and most preferred, aspect of this invention the vent assembly is arranged to prevent liquid from entering into the insulating space and to equalize the internal pressure within the insulating space and the ambient atmospheric pressure surrounding the outer member to allow higher internal pressure within the insulating space to vent to the ambient atmosphere when the container is heated and to close off to seal the insulating space to maintain the vacuum therein when the container is cooled.

DESCRIPTION OF THE DRAWING

FIG. 4A is a greatly enlarged sectional view of one exemplary embodiment of a vent assembly, e.g., a one-way valve with a gas permeable cover disposed over a vent hole, constructed in accordance with this invention and shown within the circular area designated 4A-6B in FIG. 3;

FIG. 4B is an isometric view of the portion of the vent assembly shown in FIG. 4A;

FIG. 6A is a greatly enlarged sectional view of another exemplary embodiment of a vent assembly, e.g., a one-way valve disposed over a vent hole, constructed in accordance with this invention and shown within the circular area designated 4A-6B in FIG. 3; and FIG. 6B is an isometric view of the portion of the vent assembly shown in FIG. 6A.

DETAILED DESCRIPTION OF THE PREFERRED EMBODIMENT

Figure 2:
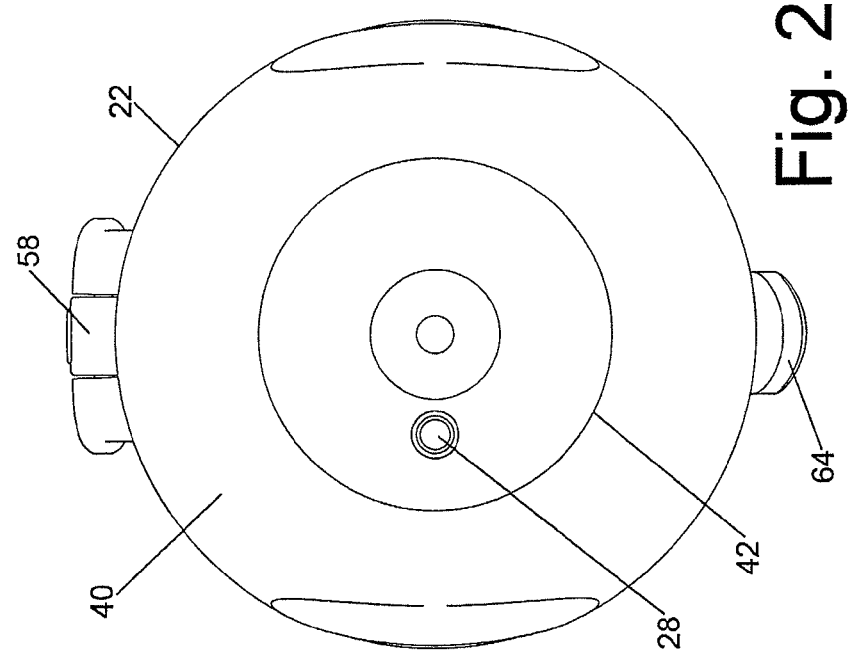
FIG. 2 is an enlarged bottom plan view taken along line 2-2 of FIG. 1.
Figure 1:
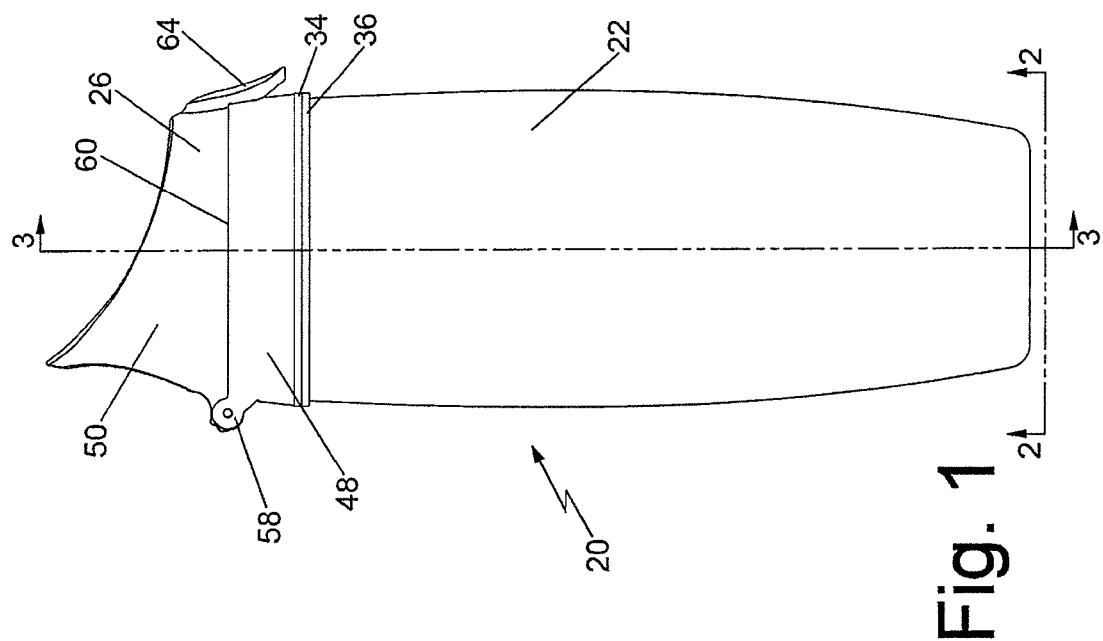
FIG. 1 is a side elevation view of one exemplary insulated container, e.g., an insulated bottle assembly and lid including a vent assembly constructed in accordance with the teachings of this invention.
Figure 3:
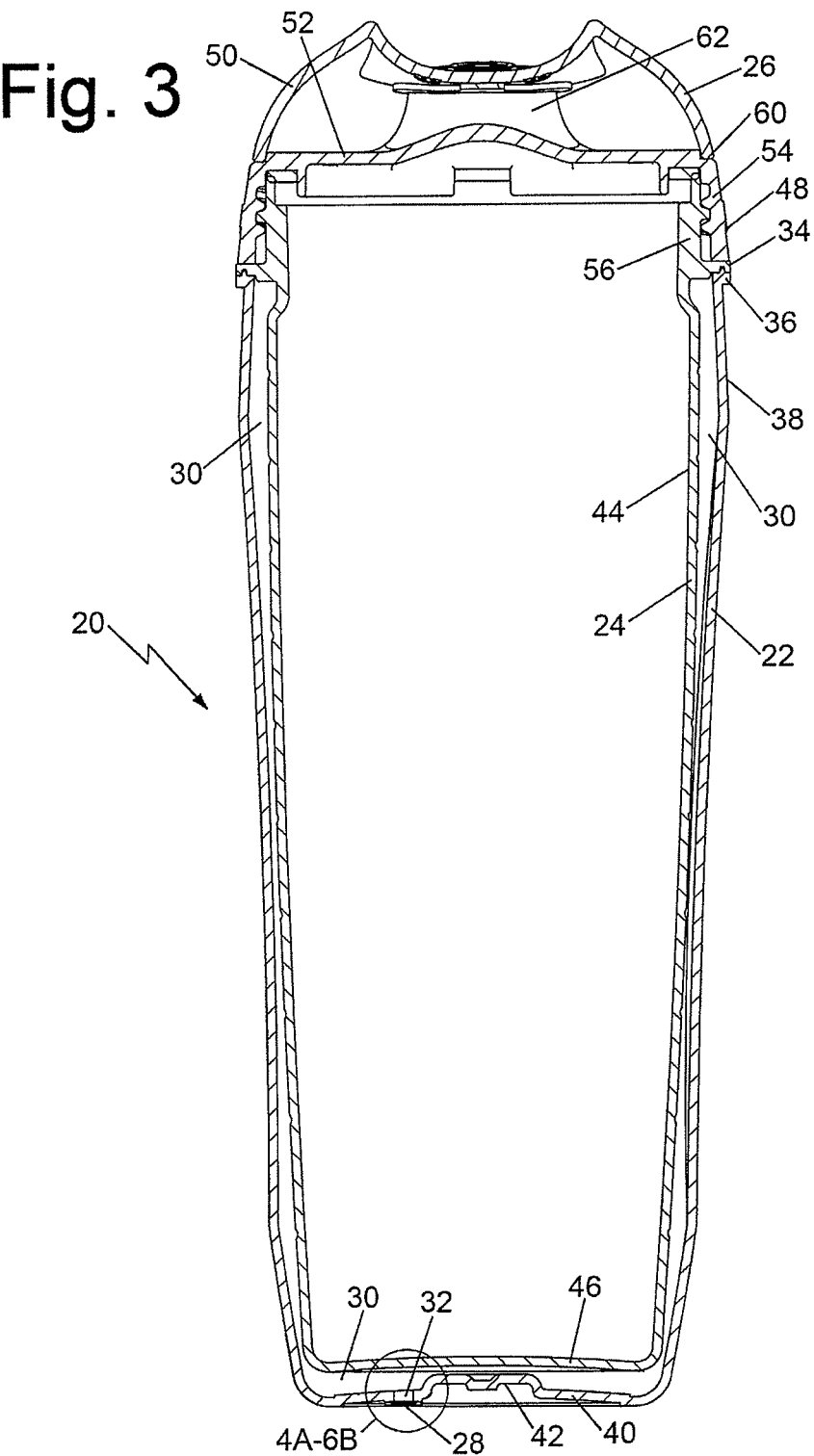
FIG. 3 is an enlarged vertical sectional view of the exemplary embodiment of the container taken along line 3-3 of FIG. 1.

Referring now to the various figures of the drawing wherein like reference characters refer to like parts, there is shown at 20 in FIGS. 1, 2 and 3 one exemplary embodiment of an insulated container which is constructed in accordance with this invention. It must be pointed out at this juncture that the container 20 is merely illustrative of numerous double walled container products that make use of a pair of vessels separated by an insulating space to provide thermal insulation for the inner vessel.

The double walled container 20 is best seen in FIGS. 1-3 and basically comprises an assembly of a hollow outer body or vessel 22, a hollow inner liner or vessel 24, a lid assembly 26 and a vent assembly 28. The outer vessel 22 is a hollow member which is formed, e.g., blow molded, of a plastic, e.g., thermoplastic, material. The hollow inner vessel 24 is also formed, e.g., blow molded, of a plastic material. The material of the inner vessel may be the same plastic material as the outer vessel 22 or some other material. The inner vessel 24 is disposed within the outer vessel 22. When so located they are separated from each other by an insulating space 30. That space is arranged to be under some vacuum. With this arrangement the inner vessel 24 of the container is thermally insulated from the ambient atmosphere. The inner vessel 24 is arranged to receive any type of liquid, e.g., cold water or soda, hot tea or coffee, etc., to maintain its temperature. The lid assembly 26, which will be described later is arranged to be opened to provide access to the contents of the container held within the inner vessel. This enables the user to fill the container with some liquid when desired and to remove, e.g., drink or pour, the contents the container when desired.

As will be described in considerable detail later the vent assembly 28 of this invention can take various forms. Two of the exemplary forms are such that any air or other gas that may be in the insulation space can vent out of that space through a vent hole 32 (FIGS. 3 and 4A-6B) in the outer vessel 22 when the container is subjected to high heat (such as could occur when it is being washed in a dishwasher). Two of the exemplary forms are such that liquid is prevented from entering through the vent hole into the interior of the insulating space. For example, in one exemplary disclosed embodiment, i.e., the embodiment of FIGS. 4A and 4B, the vent assembly 28 comprises a one-way valve and a gas permeable cover disposed over the vent hole 32. This arrangement enables the insulating space 30 to be automatically recharged with a vacuum whenever the container is subjected to high heat, such as when the container is placed within a dishwasher to clean it, and then is taken out of the dishwasher to cool. Moreover, the gas permeable cover prevents the ingress of water or other liquids into the insulating space even when the one-way valve is open. In another exemplary disclosed embodiment, i.e., the embodiment of FIGS. 5A and 5B, the vent assembly comprises a gas permeable cover disposed over the vent hole 32 to prevent the ingress of water or other liquids into the insulating space. In still another exemplary disclosed embodiment, i.e., the embodiment of FIGS. 6A and 6B, the vent assembly comprises a one-way valve disposed over the vent hole 32 to allow gases to vent out of the insulating space when the container is subjected to high heat, such as when the container is placed within a dishwasher to clean it.

Before discussing the details of the various vent assemblies, a brief discussion of further details of the double walled container and its lid assembly is in order. In particular, as stated above the inner vessel 24 is disposed within the outer vessel 22. The two vessels are bonded together, e.g., and ultrasonically welded, to form a unitary double walled container having the insulating space 30 located between the walls of the two vessels. As best seen in FIG. 3 the inner vessel includes a flange 34 which serves the purpose of supporting the inner vessel on a flange 36 of the outer vessel during that ultrasonic welding. The flanges 34 and 36 are constructed in accordance with the teachings in U.S. Provisional Application Ser. No. 61/567234, filed on Dec. 6, 2011, entitled Portable Beverage Container With Ultrasonic Welded Joint And Method Of Making The Same, which is assigned to the same assignee as this invention and whose disclosure is incorporated by reference herein. The outer vessel includes a generally cylindrical sidewall 38, and a somewhat concave bottom wall 40 having a central depression 42. The flange 36 is located at the top end of the sidewall 38 and includes an annular wall projecting up from the top surface of the flange. The inner vessel 24 includes a generally cylindrical sidewall 44 and a slightly concave bottom wall 46. The top end portion of the sidewall 44 includes the heretofore identified flange 34, which projects radially outwardly from that sidewall. The flange 34 includes an engagement surface in the form of an annular recess or groove extending into the undersurface of that flange. The undersurface of the flange 34 is of a complementary shape to that of the flange 36 to receive the flange therein, with the upstanding annular wall of the flange 36 received within the annular groove in the flange 34. This arrangement forms a tongue and groove interference (or double shear) joint, which is suitable for concentrating ultrasonic welding energy thereat.

The details of the lid assembly will now be discussed with reference to FIGS. 1 and 3. The lid assembly is also formed of a plastic material (which can be the same or a different material from the material(s) forming the outer vessel 22 and the inner vessel 24) or of any other material. It includes a ring portion 48 and a cap portion 50. The ring portion includes a top wall 52 and a peripheral sidewall 54. The sidewall 54 includes internal threads which are arranged to be threadedly connected (screwed onto) a correspondingly externally threaded cylindrical portion extending upward from the top of the inner vessel 24. The cap portion 50 is a hollow member which is arranged to cover or seal off the interior of the bottle, i.e., the inner vessel 24. The cap portion is connected to the ring portion by a hinge 58 (FIGS. 1 and 2) so that it can pivoted downward into engagement with the ring portion 48, whereupon its lower peripheral edge 60 engages an annular ledge extending about the periphery of the top wall 52 as shown in FIG. 3. The center of the top wall 52 is in the form of a tapering hollow spout, through which the contents of the inner vessel can be accessed when the cap portion 50 is pivoted upward and backward. This feature enables one to readily fill the vessel 24 or to drink from the vessel. A clasp or latch 64 (FIGS. 1 and 2) are provided on the cap portion 50 to engage the ring portion 48 to hold the cap portion in the closed position, like shown in FIG. 1, to thereby close off the interior of the container.

Referring now to FIGS. 4A and 4B, the details of one exemplary embodiment of the vent assembly 28 will now be discussed. That assembly, as mentioned earlier comprises a one-way valve and a gas permeable cover. In particular, as can be seen the hole 32 is in the form of an aperture in the bottom wall 40 of the outer vessel that is in fluid communication with the insulating space 30. The bottom surface of the bottom wall 40 contiguous with the hole 32 is planar and forms the valve seat 66 for the one-way, check valve of this embodiment. A portion of the bottom wall 40 just outside the valve seat is relieved to form an annular recess or groove 68 surrounding the valve seat. An elastomeric, e.g., rubber, disc 70 is disposed over the vent hole 32 and is of sufficient size that the portion of its upper surface that is contiguous with its outer periphery abuts the planar valve seat 66. The disk 70 forms the valve member or element of the one-way, check valve. To that end, the elastomeric disc is adhesively secured via a layer of adhesive 72 to a disc of material 74 making up the gas permeable cover. The cover 74 is formed of a membrane material that allows passage of gas but not liquids or other contaminants therethrough. The material can be any suitable commercially available material, such as GORE-TEX® GAW 112 waterproof/breathable fabric available from W. L. Gore & Associates or TYVEK® flash spun high-density polyethylene fibers available from DuPont. The gas permeable membrane disc 74 is in turn adhesively secured to the bottom surface of the bottom wall of the outer vessel 22 outside the annular groove 68 by a ring of adhesive 76 to hold the valve element 70 in normal engagement with the valve seat. During assembly of the vent assembly the rubber disc 70 is compressed to tension the membrane 74. Moreover, the valve seat and the membrane bond area are stepped as shown to develop proper tension. This arrangement serves to act as the spring to maintain the one-way valve seal in it normally closed condition as shown in FIGS. 4A and 4B.

Upon the occurrence of excess pressure within the vacuum space 30, such as could occur when the container is subjected to high heat during washing in a dishwasher, the increased pressure in any residual air within the space 30 will cause the valve member 70 to move off of the valve seat 66, whereupon that air will be able to pass through the interface between the valve seat and the valve element into the annular groove 68 and out to the ambient atmosphere through the underlying portion of the membrane 74. The membrane, being gas permeable, but liquid impermeable prevents any liquids from gaining ingress into the insulating space while the valve member 70 is open (i.e., off of the valve seat). After the container is taken from the dishwasher, as it cools the pressure within the insulating space 30 begins to equalize, whereupon when a predetermined pressure is reached the valve member 70 reseats itself on the valve seat 66, thereby closing the valve. Further cooling of the container, with the valve closed, prevents any additional air from gaining ingress into the insulating space 30, thereby automatically recharging the vacuum therein. Thus, the vacuum is recharged each time that the container is run through a dishwasher. Minor leakage through the seals or the permeability of the container material does not matter since the vacuum is recharged.

Figure 5A:
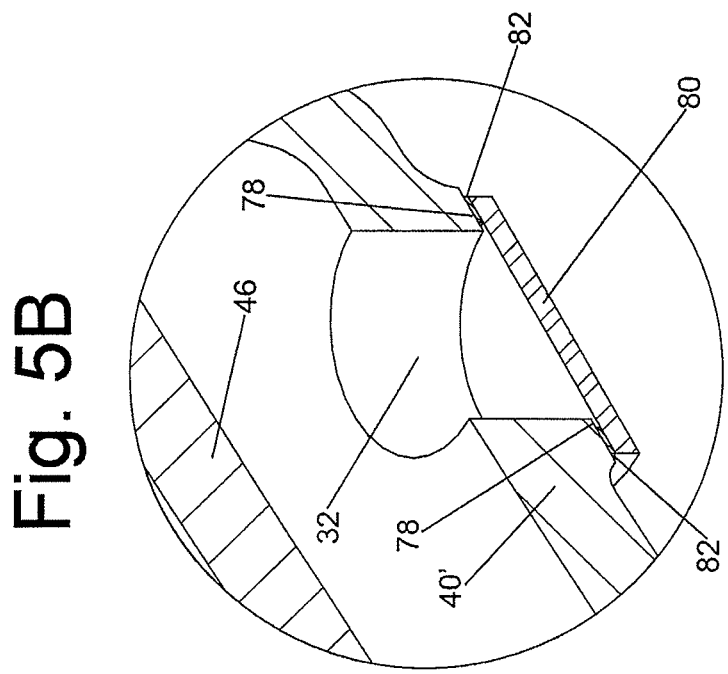
FIG. 5A is a greatly enlarged sectional view of another exemplary embodiment of a vent assembly, e.g., a gas permeable member disposed over a vent hole, constructed in accordance with this invention and shown within the circular area designated 4A-6B in FIG. 3.
Figure 5B:
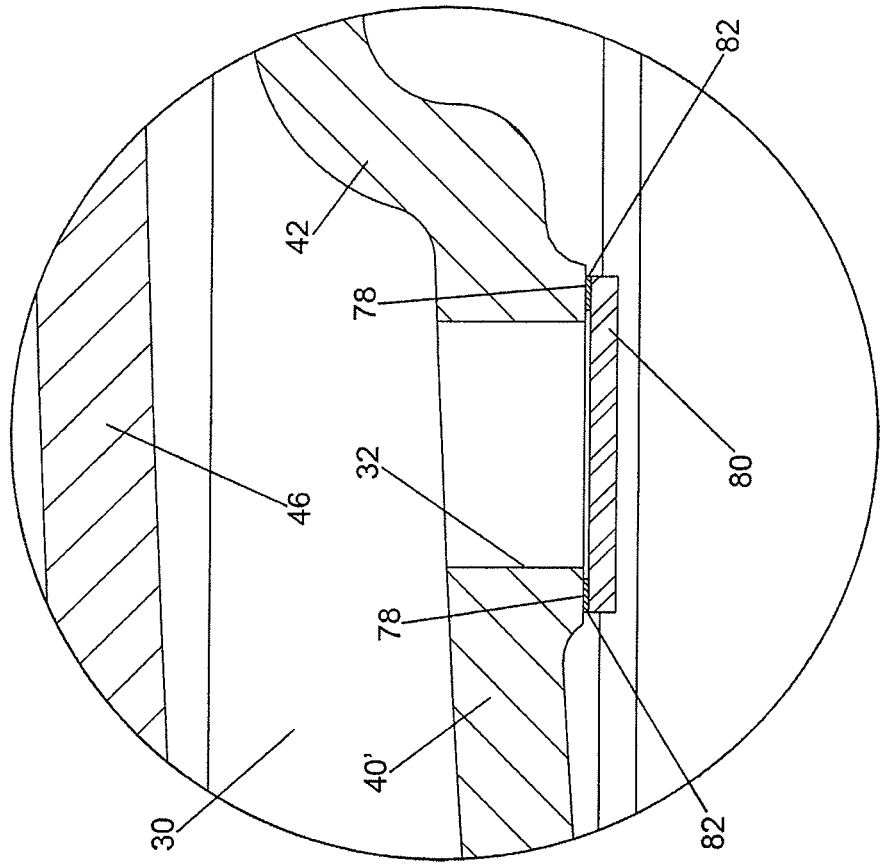
FIG. 5B is an isometric view of the portion of the vent assembly shown in FIG. 5A.

Turning now to FIGS. 5A and 5B, the details of the vent assembly 28 that is in the form of a gas permeable cover disposed over the vent hole 32 will now be discussed. That vent assembly does not include a check valve. However, since the vent includes a gas permeable membrane the pressure within the space 30 will always be equalized to the ambient atmospheric pressure surrounding the outer member. Thus, the embodiment of FIGS. 5A and 5B prevents the build up of pressure when the container is subjected to heat, such as occurs when it is washed in a dishwasher. Moreover, since the membrane is gas permeable, but liquid impermeable, it precludes liquids or other contaminants from entering into the insulating space 30. Since the embodiment of FIGS. 5A and 5B doesn't include a check valve, the bottom surface of the bottom wall of the outer vessel 22 need not be constructed to include a valve seat 66 and contiguous annular groove 68, as was the case with the embodiment of the vent assembly shown in FIGS. 4A and 4B. Instead, the bottom wall of the outer vessel 22, which is now designated by the reference number 40', includes a generally planar surface 78 contiguous with the hole 32. A disc 80 of a membrane material that allows passage of gas but not liquids or other contaminants therethrough, like that making up disc 74, is adhesively secured via a ring of adhesive 82 to the planar surface 78.

Turning now to FIGS. 6A and 6B, the details of the vent assembly 28 that is in the form of a one-way check valve disposed over the vent hole 32 will now be discussed. That vent assembly does not include a gas permeable membrane. Thus, it does not preclude the ingress of liquid into the valve at all times like the embodiments of FIGS. 4A, 4B, and FIGS. 5A and 5B. As can be seen, the bottom surface of the bottom wall of the outer vessel 22, which is now designated by the reference number 40", includes a generally planar surface contiguous with the hole 32. That surface forms the valve seat 84 for the one-way valve of this embodiment. A portion of the bottom wall 40" just outside the valve seat 84 is relieved to form an annular recess or groove 86 surrounding the valve seat. Another annular planar portion 88 of the bottom wall 40 is located just outside the annular groove 86. The planar surface of portion 88 is in a plane slightly higher than the plane of the valve seat 84. An elastomeric, e.g., rubber, disc 90 is disposed over the vent hole 32 and is of sufficient size and the upper surface contiguous with its central portion is planar so that it abuts the valve seat 84. The upper surface of the portion 92 of the disc 90 contiguous with its periphery is also planar and is disposed in a plane above the plane of the surface which engages the valve seat. The portion 92 of the disc 90 is adhesively secured to the surface 88 via a layer of adhesive 94. The disc 90 forms the valve member or element of the one-way check valve of this embodiment. A plurality of equidistantly spaced apertures 96 are provided in the disc 90 close to its outer periphery and such that when the disc is secured to the bottom wall 40" the apertures 96 are aligned with the annular groove 86. During assembly of the valve the rubber disc 90 is tensioned. Moreover, the stepped shape of the valve seat 84 and the area 88 to which the disc is secured develops the proper tension and that combination serves to act as the spring to maintain the one-way valve seal.

In operation the valve member 90 is normal seated on the valve seat to close off the vent hole 32. Upon the occurrence of excess pressure within the vacuum space 30, such as could occur when the container is subjected to high heat during washing in a dishwasher, the increased pressure in any residual air within the space 30 will cause the valve member 90 to move off of the valve seat 84, whereupon that air will be able to pass through the interface between the valve seat and the valve element into the annular groove 86 and out to the ambient atmosphere through the apertures 96 in the valve member.

As with the embodiments of the invention shown in FIGS. 4A and 4B, when a container with the vent assembly constructed like shown in FIGS. 6A and 6B is taken from the dishwasher, as it cools the pressure within the insulating space 30 begins to equalize, whereupon when a predetermined pressure is reached the valve member 90 reseats itself on the valve seat 84, thereby closing the valve. Further cooling of the container, with the valve closed, prevents any additional air from gaining ingress into the insulating space, thereby automatically recharging the vacuum therein. Thus, the vacuum is recharged each time that the container is run through a dishwasher. Minor leakage through the seals or the permeability of the container material does not matter since the vacuum is recharged.

It should be pointed out at this juncture that the vent assemblies shown and described herein represent but a few of a myriad of assemblies that can be constructed in accordance with this invention to achieve the ends of this invention. Thus, those embodiments are not to be deemed limiting. Moreover, the materials making up the vent assemblies can be selected as appropriate. Thus, the examples of the materials given are also not limiting. Finally, the details regarding the construction and arrangement of the container itself, e.g., its walls, insulating space, lid, etc., as described above are merely exemplary of various arrangements and constructions that containers in accordance with this invention can take. Accordingly, the details of the container and its lid as described above are not limiting.

Without further elaboration the foregoing will so fully illustrate our invention that others may, by applying current or future knowledge, adopt the same for use under various conditions of service.

We claim:

1. A container comprising an outer member, an inner member, an insulating space and a vent assembly, said outer member being formed of a plastic material and having a sidewall, said inner member being formed of a plastic material and having a sidewall, said inner member being disposed within said outer member with said insulating space being located between said sidewalls of said outer and inner members, said vent assembly being located in said outer member in communication with said insulating space and comprising a gas permeable member operable to equalize the internal pressure within said insulating space and the ambient atmospheric pressure surrounding said outer member, whereupon higher internal pressure within said insulating space can vent to the ambient atmosphere through said gas permeable member upon the occurrence of excess pressure within said insulating space when said container is heated, while enabling ambient air to pass through said gas permeable member back into said insulating space when said container is cooled, said vent assembly being configured to allow the passage of gases into said insulating space at all times while preventing liquids from entering into said insulating space at all times, said insulating space being configured to have some vacuum therein and wherein said vent assembly additionally comprises a valve arranged to equalize the internal pressure within said insulating space and the ambient atmospheric pressure surrounding the outer member.

2. The container of claim 1 wherein said valve is arranged to allow higher internal pressure within said insulating space to vent to the ambient atmosphere when said container is heated, and to close off to seal said insulating space to maintain said vacuum therein when said container is cooled.

3. The container of claim 1 wherein said valve comprises a one-way valve.

4. The container of claim 3 wherein said container comprises a wall portion having a vent hole therein, with a portion of said wall contiguous with said vent hole forming a valve seat, said valve comprising a flexible member disposed on said valve seat and configured to be moved off of said valve seat upon the occurrence of excess pressure within said insulating space.

5. The container of claim 4 wherein said gas permeable member is coupled to said wall portion and disposed over said flexible member through which gas may flow to the ambient atmosphere when said flexible member moves off of said valve seat upon the occurrence of excess pressure within said insulating space.

6. The container of Claim 1 additionally comprising a lid assembly.

7. A container comprising an outer member, an inner member, an insulating space and a vent assembly, said outer member being formed of a plastic material and having a sidewall, said inner member being formed of a plastic material and having a sidewall, said inner member being disposed within said outer member with said insulating space being located between said sidewalls of said outer and inner members, said insulating space being hollow and configured to have some vacuum therein, said vent assembly being located in said outer member in communication with said insulating space and being configured to prevent liquid from entering into said insulating space at all times, said vent assembly comprising a valve seat, and a repeatedly operable one-way valve, said valve seat surrounding a hole in said outer member, said one way valve comprising a flexible disk coupled to said valve seat, said flexible disk configured to repeatedly operate automatically to equalize the internal pressure within said insulating space and the ambient atmospheric pressure surrounding said outer member, whereupon said flexible disk moves off of said valve seat to allow higher internal pressure within said insulating space to vent to the ambient atmosphere through said hole upon the occurrence of excess pressure within said insulating space when said container is heated, and moves back onto said valve seat to close off said hole to seal said insulating space to maintain said vacuum therein when said container is cooled.

8. The container of claim 7 wherein said vent assembly additionally comprises a gas permeable member.

9. The container of claim 8 wherein said gas permeable member is flexible and wherein said flexible disk is secured to said gas permeable member.

10. The container of claim 7 additionally comprising a lid assembly.

11. A container comprising an outer member, an inner member, an insulating space and a vent assembly, said outer member being formed of a plastic material and having a sidewall, said inner member being formed of a plastic material and having a sidewall, said inner member being disposed within said outer member with said insulating space being located between said sidewalls of said outer and inner members, said insulating space is arranged to have some vacuum therein, said outer wall having a vent hole therein, with a portion of said outer wall contiguous with said vent hole forming a valve seat, said vent assembly being located in said outer member in communication with said insulating space and being arranged to prevent liquid from entering into said insulating space, said vent assembly comprising a gas permeable member and a one-way valve, said one-way valve comprising a flexible member disposed on said valve seat and arranged to equalize the internal pressure within said insulating space and the ambient atmospheric pressure surrounding said outer member by moving off of said valve seat to allow higher internal pressure within said insulating space to vent to the ambient atmosphere upon the occurrence of excess pressure within said insulating space when said container is heated, and to close off to seal said insulating space to maintain said vacuum therein when said container is cooled, said gas permeable member being coupled to said wall portion and disposed over said flexible member through which gas may flow to the ambient atmosphere when said flexible member moves off of said valve seat upon the occurrence of excess pressure within said insulating space.

12. The container of claim 11 additionally comprising a lid assembly.

\* \* \* \* \*